United States Patent
Ogata et al.

(10) Patent No.: US 8,446,833 B2
(45) Date of Patent: May 21, 2013

(54) MEASUREMENT APPARATUS, DISPLAYS AND METHODS FOR INDICATING CHANNEL STATUS

(75) Inventors: Hideaki Ogata, Chiba (JP); Koichi Sega, Saitama (JP); Yoneo Akita, Tokyo (JP)

(73) Assignee: Tektronix, Inc., Beaverton, OR (US)

( * ) Notice: Subject to any disclaimer, the term of this patent is extended or adjusted under 35 U.S.C. 154(b) by 1073 days.

(21) Appl. No.: 11/690,058

(22) Filed: Mar. 22, 2007

(65) Prior Publication Data

US 2011/0149749 A1 Jun. 23, 2011

(30) Foreign Application Priority Data

Mar. 22, 2006 (JP) .................................. 2006-79304

(51) Int. Cl.
*H04L 1/00* (2006.01)
(52) U.S. Cl.
USPC ......................................... 370/241; 370/252
(58) Field of Classification Search
USPC ................. 370/203–211, 252–254, 320, 335, 370/342, 441
See application file for complete search history.

(56) References Cited

U.S. PATENT DOCUMENTS

2003/0053532 A1* 3/2003 Cutler et al. .................. 375/224
2010/0034105 A1* 2/2010 Sega et al. ..................... 370/252

FOREIGN PATENT DOCUMENTS

JP         2005303455 A    10/2005
WO         0205506 A2       1/2002

\* cited by examiner

*Primary Examiner* — Frank Duong
(74) *Attorney, Agent, or Firm* — Matthew D. Rabdau; Michael A. Nelson

(57) ABSTRACT

The present invention is directed to a display for easily understanding time changes of communication conditions of channels using a plurality of sub-carriers. Layers corresponding to the plurality of channels are displayed along the time base in such a manner that width of each layer is determined in accordance with the number of sub-carriers used for each channel at any given time. Additionally, colors or patterns of each layer may be modified in accordance with modulation types or power levels of the corresponding layer. The relationship between colors or patterns of the layer and modulation types or power levels is displayed.

4 Claims, 3 Drawing Sheets

MEASUREMENT APPARATUS, DISPLAYS AND METHODS FOR INDICATING CHANNEL STATUS

CROSS-REFERENCE

This application claims foreign priority to Japanese Application 2006-79304, entitled "Measurement Equipment, Display Method Therefor and Display of Channel Condition," filed Mar. 22, 2006.

BACKGROUND

The present invention relates to a display suitable for monitoring communication conditions of each channel in multi-channel communications using a plurality of sub-carriers such as OFDM (Orthogonal Frequency Division Multiplex) systems.

OFDM systems have been widely employed in multi-channel communication standards using a plurality of sub-carriers, such as wireless LAN (Local Area Network) systems, Wi-Fi, WiMax, etc. For more efficient communication in such communication systems, the number of sub-carriers and modulation types to be used for each channel change from time to time in response to the amount of data to be sent or received and the communication environment. As for modulation types to be used, the data transmission rate is prioritized using a modulation type such as 16 Quadrature Amplitude Modulation (16QAM) or the like having a high data transmission rate (i.e., bit rate) per unit time for each channel in case of good transmission and receiving environment. On the other hand, reliable data transfer is prioritized using a modulation type of low bit rate such as BPSK (Bi-Phase Shift Keying) or the like in case of poor transmission and receiving environment.

In order to ensure stable communication quality, it would be useful to continuously monitor dynamic changes of wireless signals over time. A known measurement equipment for measuring such signal (i.e., signal to be measured), particularly in frequency domain is a spectrum analyzer. Many attempts have been made to measure such signals using a spectrum analyzer.

For example, U.S. Pat. No. 6,219,340 discloses in its specification an invention to graphically display the condition of a signal to be measured for easily understanding the condition of the signal to be measured. In this US patent, a bar corresponding to each channel of a Code Division Multiple Access (CDMA) signal, which is a communication system utilized in cellular phone systems, is displayed in such a manner that width of the bar indicates which code layer is in active condition. However, the display lacks the time axis, thereby failing to clearly indicate how each channel changes over time.

In wireless LAN systems, or the like, the most efficient data transmission is achieved by timely changing the number of sub-carriers to be used for each channel and the modulation types depending on communication environment that changes from time to time. Unfortunately, however, it was difficult in the prior art to easily understand how changes were made relative to time.

SUMMARY

It is therefore desirable to display changes in communication conditions of each channel relative to time for enabling the user to easily control signal quality of each channel. Embodiments of the present invention overcome such disadvantages of the prior art and provide measurement equipment that is capable of displaying condition of the signal to be measured relative to time.

Embodiments of the present invention are directed to a display method for measurement equipment in which a signal to be measured, which includes a plurality of sub-carriers, is received and channel conditions in the signal to be measured are displayed on a display screen. This method comprises a step of setting a time base on the display screen and a step of displaying the layers corresponding to respective channels along the time base in such a manner that width of the layers at any desired time is determined based on the number of sub-carriers used for each respective channel at that time. In some embodiments, colors or patterns of each layer change in accordance with modulation types or power levels of the corresponding channel.

Another embodiment of the present invention includes a display of the channel conditions in a signal to be measured including a plurality of sub-carriers. In this display, layers corresponding to channels are displayed along the time base in such a manner that width of each layer at any desired time is determined in accordance with the number of sub-carriers used for the corresponding channel at that time. Moreover, the layers may be changed in color or pattern in accordance with modulation types or power levels of the corresponding channels.

Further embodiments of the present invention comprise measurement equipment for receiving a signal to be measured containing a plurality of sub-carriers and displaying channel conditions in the signal to be measured on a display screen, wherein a time base is set on the display screen of measurement equipment and layers corresponding to the channels are displayed along the time base. The width of each layer at any desired time is determined in accordance with the number of sub-carriers used for the corresponding channels at that time. It is also possible to change the colors or the patterns of each layer in accordance with modulation types or power levels of the corresponding channel.

According to some embodiments of the present invention, the user is able to easily and graphically (visually) understand signal quality conditions because changes of channel conditions relative to time are visually displayed. As a result, embodiments of the present invention are suitable for constantly monitoring signal conditions.

DETAILED DESCRIPTION

Figure 1:
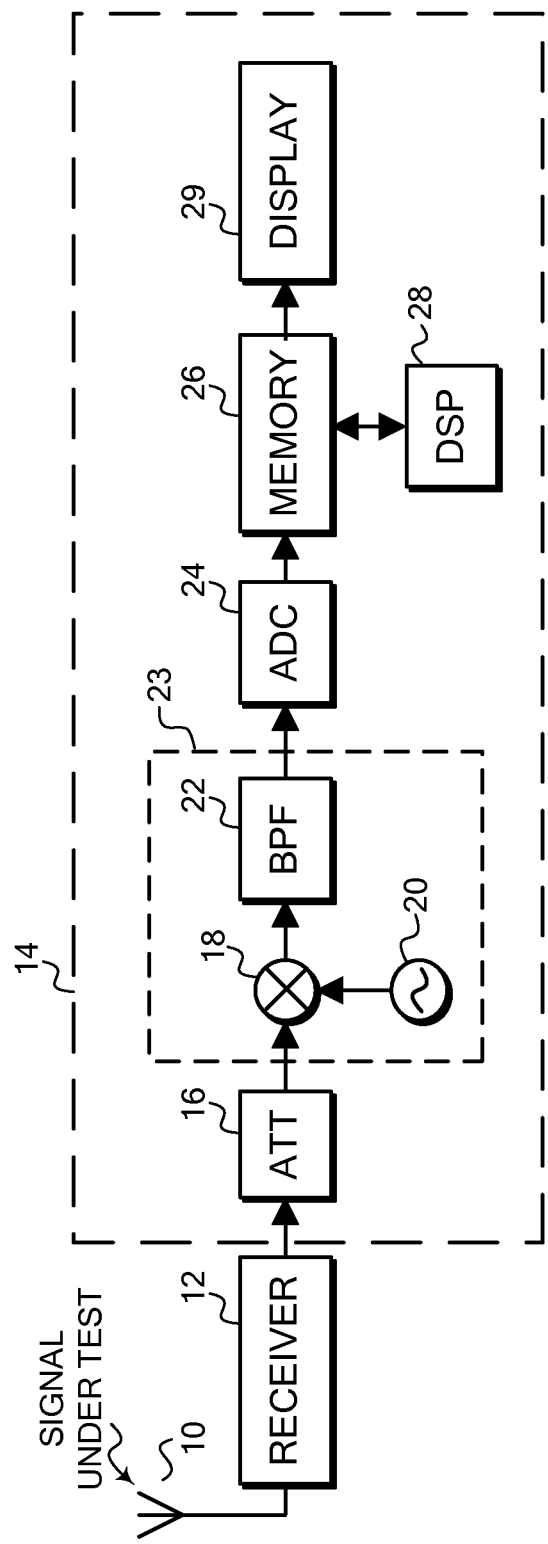
FIG. 1 is an example of a functional block diagram of a wireless signal measurement system using measurement equipment that is suitable to implement the present invention.

Now, embodiments of the present invention will be described hereunder with reference to the accompanying drawings. FIG. 1 is a functional block diagram illustrating an example of the wireless signal measurement system using the measurement equipment 14 that is suitable to implement the present invention. The measurement equipment 14 that is suitable to implement the present invention comprises various circuit blocks that are controlled by a CPU (not shown) in accordance with programs stored in a hard disk (not shown)

or the like. It is to be noted that the user is able to make desired settings of the measurement equipment 14 by way of an operation panel (not shown).

Figure 2:
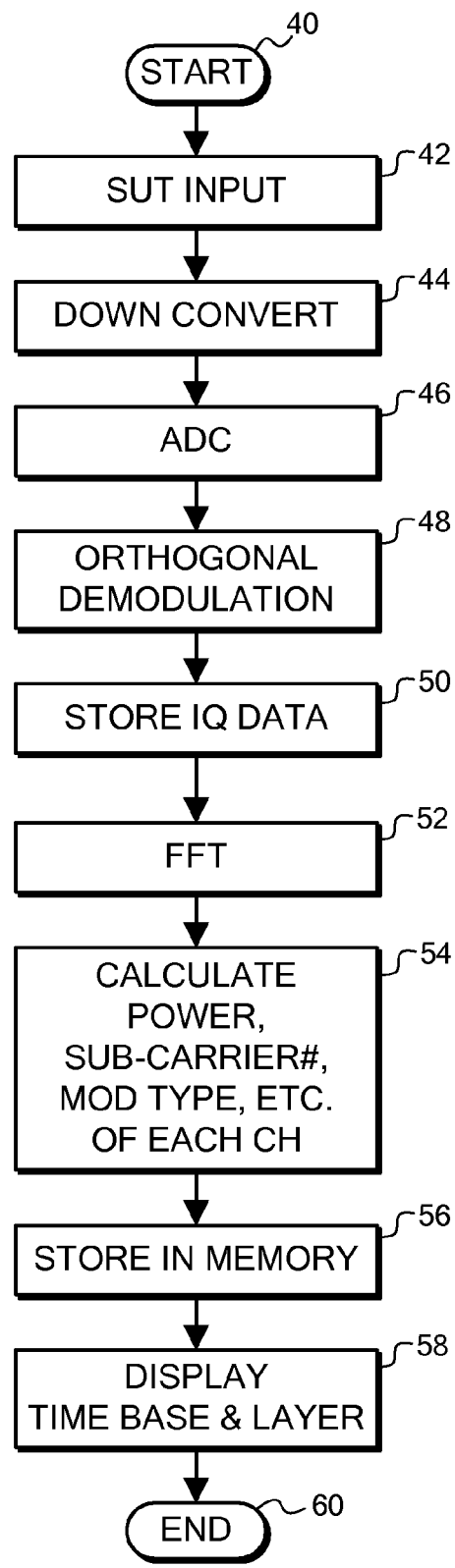
FIG. 2 is a flowchart according to one embodiment of the present invention.

FIG. 2 is a flowchart according to one embodiment of the present invention. Now, embodiments of the present invention will be described with reference to FIG. 1 and FIG. 2. A signal to be measured is, for example, a multi-channel signal using OFDM such as in wireless LAN systems. The signal to be measured is converted into an electrical signal in a receiver circuit 12 by way of an antenna 10 and the electrical signal is then supplied to a preamplifier circuit (ATT) 16 by way of an input terminal of the measurement equipment 14. The preamplifier circuit 16 adjusts the input signal to suitable amplitude before being supplied to a down-converter 23 (step 42). The down-converter 23 comprises a mixer 18, a local oscillator 20 and a bandpass filter 22 and performs frequency conversion (down-converts) of the input signal frequency in an analog manner for converting into an intermediate frequency (IF) signal (step 44). Although a single stage of the down-converter 23 is shown in FIG. 2, it is possible to use two or more stages if necessary. Then, the IF signal is converted into digital data (time-domain data) by an analog-to-digital converter (ADC) 24 (step 46).

A DSP (Digital Signal Processor) 28 performs orthogonal demodulation of the digital data in time-domain (step 48). Generated I (In-phase) and Q (Quadrature) data in time-domain are stored in a memory 26 (step 50). Subsequently, the DSP 28 performs a fast Fourier transform (FFT) (step 52) for converting time-domain data into frequency-domain data. Using frequency-domain data, the DSP 28 extracts symbol data from each sub-carrier and regenerates various kinds of information in each channel. It is to be noted that in certain embodiments of the present invention at least the number of sub-carriers and their modulation types are among the various kinds of information to be detected for each channel. Simultaneously, it is possible to detect power level of each channel (step 54). Information that is obtained in processing of the DSP 28 is recorded in a memory 26 (step 56).

Figure 3:
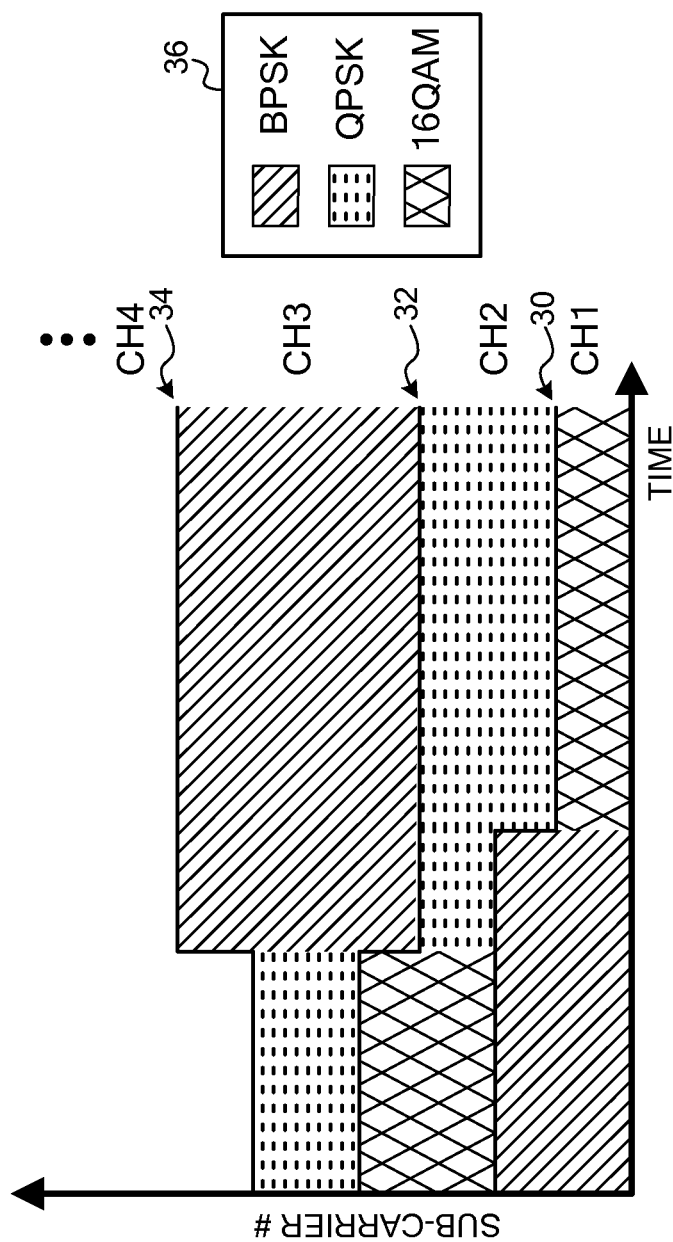
FIG. 3 is a graph illustrating an embodiment of the display according to the present invention.

Now, FIG. 3 is a graph that is an example of the display according to an embodiment of the present invention. Based on acquired information for each channel, the measurement equipment 14 displays a graph as exemplified in FIG. 3 on the display screen of a display device 29. In the displayed graph, the horizontal axis represents time and the vertical axis represents number of sub-carriers. Layers corresponding to each of a plurality of channels are displayed along the time axis (step 58). For simplifying the description, it is to be noted that three layers for first through third channels are displayed in FIG. 3. That is, layers for fourth and subsequent channels are excluded in FIG. 3. It is needless to mention that fourth and subsequent channels are similarly displayed. However, the user has an option to set dummy channels containing essentially no data such that they are intentionally excluded from the display.

Width (or thickness) of each layer is modified in accordance with the number of sub-carriers used in each channel at a certain time. Accordingly, the user is able to visually and easily understand how many sub-carriers are used by each channel at a particular time from the width of respective channel. Additionally, color or pattern of each layer can be changed in accordance with the modulation type that is used in each channel at a certain time. Accordingly, by monitoring the color or pattern of each layer, the user is able to visually and easily understand which modulation type is used in each channel at a certain time. For convenience of understanding the relationship between colors or patterns and corresponding modulation types in each layer, in some embodiments, an annotation display column 36 adjacent to the graph is provided, for example. It is also possible to change colors or patterns of each layer in accordance with the power of each channel at a certain time instead of the modulation types. In this particular case, an annotation display column 36 for displaying the relationship between colors or patterns and corresponding power levels is provided. For clearly distinguishing adjacent layers, further embodiments provide border lines 30-34 at boundaries between adjacent layers.

Although the present invention has been described hereinabove based on the various embodiments, it is to be noted that various modifications can be made without departing from the scope and spirit of the present invention as set forth in the following claims. For example, it is possible in FIG. 3 that time is represented by the vertical axis rather than the horizontal axis. Although FIG. 3 is a two-dimensional display of time and number of subcarrriers, it is possible to add a third axis for providing a three-dimensional display. For example, it is possible to respectively assign time, number of sub-carriers and power level to the axes in depth, horizontal and vertical directions and use different colors or patterns to indicate modulation types. Width and color or pattern of each layer may be repeatedly recalculated for each symbol so as to modify the display. However, in a particular case of the signal to be measured containing information that the signal relates to symbols of a particular number and uses the same number of sub-carriers and the same modulation type, it is possible to reduce the calculation load of the DSP 28 by not recalculating at every symbol and not modifying the display of the layer for the particular number of symbols. Although the description has been made in FIG. 1 based on the example of receiving the wireless signal using the antenna 10 and the receiver circuit 12, it is possible to apply the present invention to any data that are prepared in advance such as, for example, signals before transmission, data that have been received in the past, etc.

What is claimed is:

1. A display method for measurement equipment comprising the steps of:

receiving a signal to be measured containing a plurality of sub-carriers at an input of the measurement equipment;

extracting symbol data from the sub-carriers to detect the number of the sub-carriers used for each channel in the signal to be measured;

setting a time base on a display screen of the measurement equipment; and displaying layers corresponding to the respective channels along the time base on the display screen wherein the width of each layer at any desired time is determined in accordance with the number of the sub-carriers used for the corresponding channel at that time while dummy channels containing substantially no data are not used for display.

2. The display method as recited in claim 1, wherein colors or patterns of the layers are modified in accordance with modulation types or power levels of the corresponding channels.

3. Measurement equipment comprising:

a receiving circuit for receiving a signal to be measured containing a plurality of sub-carriers at an input of the measurement equipment;

a signal processor for extracting symbol data from the sub-carriers to detect the number of the sub-carriers used for each channel in the signal to be measured; and a display for displaying layers corresponding to the respective channels along a time base wherein the width of each layer at any desired time is determined in accordance with the number of the sub-carriers used for the corresponding channel at that time while dummy channels containing substantially no data are not used for display.

4. The measurement equipment as recited in claim 3, wherein colors or patterns of the layers are modified in accordance with modulation types or power levels of the corresponding channels.

* * * * *